Figure 1:
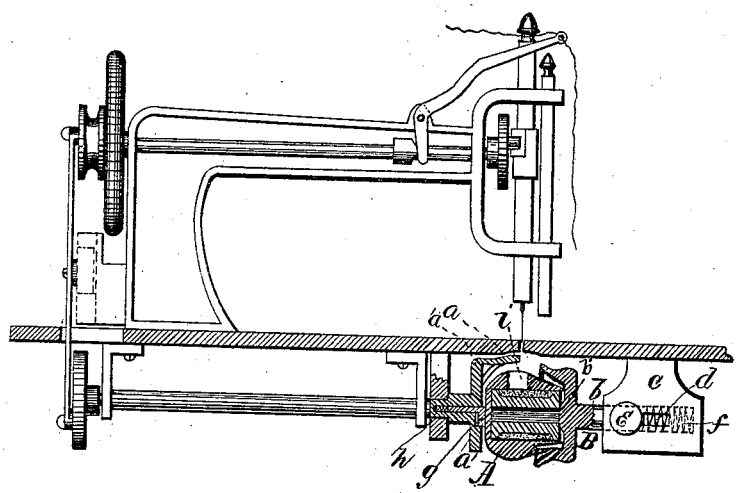

2 Sheets—Sheet 1.

J. TRIPP.
REVOLVING-HOOK SEWING-MACHINES.

No. 194,853. Patented Sept. 4, 1877.

2 Sheets—Sheet 2.
J. TRIPP.
REVOLVING-HOOK SEWING-MACHINES.
No. 194,853. Patented Sept. 4, 1877.
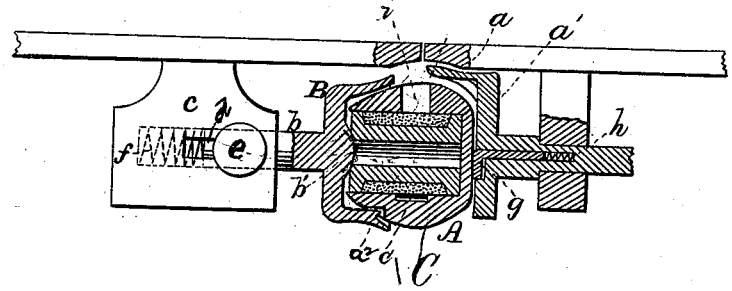
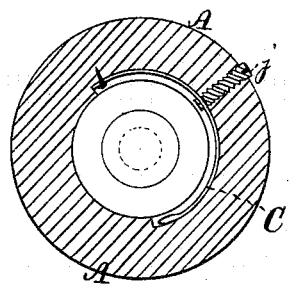 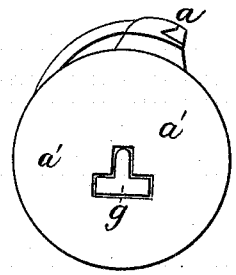

UNITED STATES PATENT OFFICE.

JAMES TRIPP, OF COLDWATER, MICHIGAN.

IMPROVEMENT IN REVOLVING-HOOK SEWING-MACHINES.

Specification forming part of Letters Patent No. 194,853, dated September 4, 1877; application filed February 21, 1877.

*To all whom it may concern:*

Be it known that I, JAMES TRIPP, of Coldwater, in the county of Branch and State of Michigan, have invented certain new and useful Improvements in Revolving-Hook Sewing-Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1, Sheet 1, is a view of my improvement, in section, applied to the other parts of a sewing-machine. Fig. 2, Sheet 2, is a view, partly in elevation and section, of my improved spool-holder attachment for sewing-machines. Fig. 3 is a transverse section of the globe or spool-holder proper, and Fig. 4 is a front view of the hook-disk.

Corresponding parts in the several figures are denoted by like letters.

This invention relates to a certain improvement in spool-holder attachments for sewing-machines; and it consists of mechanism for wabbling the spool-holder or globe, suitably clamped in place; and, secondly, of a globe which holds the spool, clamped between the hook-disk and a cup-shaped support having an internal convexity or swell, which holds the spool back into the globe, the rim of said support assisting to support the globe or holder, substantially as hereinafter more fully set forth.

In the annexed drawing, A refers to the holder proper, which is preferably of a globe shape or spherical, and within which is placed the spool of cotton, disposed endwise with reference to the hook $a$, which takes the thread from the needle, the barrel or chamber of the holder or globe being adapted to that end.

By thus constructing the holder or globe A— *i. e.*, to permit the spool to be inserted therein endwise—the diameter of the circle or path traveled by the rotating hook $a$ will be lessened, and the work thus facilitated. The globe or holder A is held or clamped between the disk $a^1$ of the hook $a$ and the cup-shaped support B, provided with a projection, $a^2$, entering a slot in the globe to prevent its rotating, provided with an extension or arm, $b$, entering a longitudinally-slotted pendant, $c$, depending from the cloth-plate of the machine. The rim of the support or cup B is flared, as particularly seen in Fig. 1, to avoid interference with the passage of the thread or cotton between it and the globe A.

Upon the inside of the support B is a convexity or swell, $b'$, which, as seen in Fig. 1, holds the spool back into the globe A, out of the way of the thread. A spring, $f$, is inserted in the pendant $c$, behind the support B, to enable the latter to hold the globe A against the disk $a^1$ of the hook $a$.

Through a slot, $d$, in the pendant $c$, is also inserted a set-screw, $e$, entering the arm $b$ of the support B, for the purpose of holding the latter back against the pressure of the spring $f$, when withdrawn, so as to permit of the removal of the globe A, with its spool, to be replaced by another filled with cotton.

The disk $a^1$ is provided with a cam, $g$, preferably of a T shape, and actuated by a spring, $h$, to cause it to oscillate or wabble the globe or holder A, so as to let the thread pass in and out from between the said disk and globe as the stitch is being formed, to lessen friction and the tendency to break the thread. The disk $a^1$ is attached to and revolves with the hook-shaft. The cam $g$ also keeps the globe or holder A pressed against the support B, to obviate rattling or noise.

The upper thread, carried by the descending needle below the cloth-plate and in proximity with the globe or spool-holder having the lower thread, is caught by the hook $a$ and carried in the form of a loop around the globe, encompassing the lower thread projecting from the globe, and forming, when properly drawn up by take-up mechanism, the ordinary lock-stitch.

It will be seen by reference to the drawing that upon applying power to the band-wheel motion will be simultaneously communicated to the needle-bar shaft and the hook-shaft, by which the hook will be caused to revolve and the needle to reciprocate vertically, the rotation of the hook being so timed with the movement of the needle as to cause the hook to take the loop from the needle when it has reached the end of its downward movement. The hook will then take it to be spread around the globe and encompass the under thread, previously passed up through the needle-orifice in the cloth-plate and held by the hand, and thus form a stitch.

Having thus described my invention, what I claim, and desire to secure by Letters Patent, is—

1. The hook-disk $a^1$, having the cam $g$, in combination with the spool-holder A and support B, substantially as and for the purpose set forth.

2. The globe or holder A, in combination with the hook-disk $a^1$ and cup-shaped support B, having an internal convexity or swell, $b'$, upon its bottom, to hold the spool in a retracted position in the globe, its rim assisting to support the latter, substantially as set forth.

In testimony that I claim the forgoing as my own I hereunto affix my signature in presence of two witnesses.

JAMES TRIPP.

Witnesses:
J. H. McGOWAN,
A. J. McGOWAN.